United States Patent
Shimizu et al.

(10) Patent No.: US 12,386,346 B2
(45) Date of Patent: Aug. 12, 2025

(54) SUPPORT DEVICE (71) Applicant: TOYOTA JIDOSHA KABUSHIKI KAISHA, Toyota (JP)

(72) Inventors: Masanori Shimizu, Toyota (JP); Hideto Watanabe, Toyota (JP); Tetsuo Hori, Toyota (JP); Hiroyuki Tsukamoto, Toyota (JP); Tetsuya Yoshikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 437 days.

(21) Appl. No.: 17/968,019

(22) Filed: Oct. 18, 2022

(65) Prior Publication Data
US 2023/0229156 A1 Jul. 20, 2023

(30) Foreign Application Priority Data

Jan. 14, 2022 (JP) .................. 2022-004178

(51) Int. Cl.
G05B 23/02 (2006.01)
G06Q 10/087 (2023.01)

(52) U.S. Cl.
CPC ..... *G05B 23/0283* (2013.01); *G05B 23/0289* (2013.01); *G06Q 10/087* (2013.01)

(58) Field of Classification Search
CPC ............ G05B 23/0283; G05B 23/0289; G06Q 10/087
See application file for complete search history.

(56) References Cited

U.S. PATENT DOCUMENTS

2010/0332272 A1* 12/2010 Ong ................. G06Q 10/20
705/305
2020/0348662 A1* 11/2020 Cella ............... G05B 19/41865

FOREIGN PATENT DOCUMENTS

| CA | 2888334 A1 | * | 4/2014 | ....... G06Q 10/06311 |
| EP | 1953692 A1 | * | 8/2008 | ............ G06Q 10/04 |
| JP | H01172621 A | * | 7/1989 | |
| JP | 2001227935 A | * | 8/2001 | ............ G01N 29/07 |
| JP | 2004-086661 A | | 3/2004 | |
| JP | WO2014/061604 A1 | | 4/2014 | |

* cited by examiner

*Primary Examiner* — Mong-Shune Chung
(74) *Attorney, Agent, or Firm* — Oliff PLC (57) ABSTRACT The technology disclosed in the present specification is embodied as a support device for supporting maintenance on an apparatus including an expendable component. The support device includes at least one computer. The at least one computer executes: a process of acquiring an index indicative of a consumption level of the expendable component; a process of, at a time point when the index indicative the consumption level reaches a predetermined threshold, specifying a necessary period of time required for replacement of the expendable component at the time point; and a process of restricting an operation of the apparatus when a remaining period of time of the expendable component, the remaining period of time being associated with the threshold, is shorter than the necessary period of time required for the replacement.

9 Claims, 5 Drawing Sheets

| EXPENDABLE COMPONENT | THRESHOLD | REMAINING PERIOD OF TIME | ACTUAL LEAD TIME |
|---|---|---|---|
| DRIVING ROTATING BODY 32 | Th1 | RT1 | LT1 |
| FIRST DRIVEN ROTATING BODY 34 | Th2 | RT2 | LT2 |
| . | . | . | . |
| . | . | . | . |
| . | . | . | . |

SUPPORT DEVICE

CROSS-REFERENCE TO RELATED APPLICATION

This application claims priority to Japanese Patent Application No. 2022-004178 filed on Jan. 14, 2022, incorporated herein by reference in its entirety.

BACKGROUND

1. Technical Field

The technology disclosed in the present specification relates to a support device for supporting maintenance on an apparatus including expendable components.

2. Description of Related Art

Japanese Unexamined Patent Application Publication No. 2004-086661 (JP 2004-086661 A) describes a system for automatically placing an order for an expendable component (e.g., a print pin of an impact printhead in a result determination machine for lottery tickets or the like) when an index (e.g., a spouting amount of a print pin) indicative of a consumption level of the expendable component reaches a threshold.

SUMMARY

A necessary period of time required for replacement of an expendable component can change depending on the stock status or the like of the expendable component. Accordingly, in the technology of JP 2004-086661 A, in a case where such an event that the necessary period of time required for the replacement of the expendable component becomes longer than usual occurs due to a stock shortage or the like, for example, an abnormality might occur in the expendable component that is being used, before the expendable component is replaced with a new expendable component for which the order has been placed. As a result, the operation of an apparatus might not be continued appropriately. The present specification provides a technology that can continue the operation of an apparatus appropriately even when a necessary period of time required for replacement of an expendable component changes.

The technology disclosed herein is embodied as a support device for supporting maintenance on an apparatus including an expendable component. The support device includes at least one computer. The at least one computer executes the following processes: a process of acquiring an index indicative of a consumption level of the expendable component; a process of, at a time point when the index indicative of the consumption level reaches a predetermined threshold, specifying a necessary period of time required for replacement of the expendable component at the time point; and a process of restricting an operation of the apparatus when a remaining period of time of the expendable component, the remaining period of time being associated with the threshold, is shorter than the necessary period of time required for the replacement.

In the support device, at a time point when the index indicative of the consumption level reaches a predetermined threshold, the at least one computer specifies a necessary period of time required for replacement of the expendable component at the time point. Hereby, at a time point when the consumption level of the expendable component reaches the predetermined threshold, and the replacement timing for the expendable component is approaching, it is possible to specify the necessary period of time required for the replacement at the time point. Further, the computer restricts the operation of the apparatus when the remaining period of time of the expendable component that is associated with the threshold is shorter than the necessary period of time required for the replacement at the time point. Hereby, it is possible to restrain exhaustion of the expendable component the replacement timing of which is approaching. This makes it possible to extend an actual remaining period of time of the expendable component. Thus, in the support device described in the present specification, it is possible to continue the operation of the apparatus appropriately based on the latest necessary period of time required for the replacement of the expendable component at the time point when the consumption level of the expendable component reaches a predetermined threshold.

The present specification also describes a support device in another aspect. The support device in this aspect supports maintenance on an apparatus including an expendable component. The support device includes at least one computer. The at least one computer is configured to execute the following processes: a process of acquiring an index indicative of a consumption level of the expendable component; a process of determining whether or not the index indicative of the consumption level reaches a predetermined threshold; a process of, at a time point before the index indicative of the consumption level reaches the threshold, specifying a necessary period of time required for replacement of the expendable component at the time point; and a process of correcting the threshold when a remaining period of time of the expendable component, the remaining period of time being associated with the threshold, is shorter than the necessary period of time required for the replacement.

In the support device, at a time point before the index indicative of the consumption level reaches a predetermined threshold, the at least one computer specifies a necessary period of time required for replacement of the expendable component at that time point. Hereby, at the time point before the consumption level of the expendable component reaches the predetermined threshold, it is possible to specify the necessary period of time required for the replacement at the time point. Further, when the remaining period of time of the expendable component that is associated with the threshold is shorter than the latest necessary period of time required for the replacement, the at least one computer corrects the threshold. Hereby, the threshold can be corrected to a threshold suitable for the latest necessary period of time. As a result, the remaining period of time of the expendable component that is associated with the threshold is also corrected. Accordingly, when the consumption level reaches the corrected threshold, it is possible to prevent the remaining period of time associated with the threshold from being shorter than the latest necessary period of time required for the replacement. Thus, it is possible to continue the operation of the apparatus appropriately based on the latest necessary period of time required for the replacement of the expendable component at the time point when the consumption level of the expendable component reaches a predetermined threshold.

Details and further improvements of the technology disclosed herein will be described in the following "DETAILED DESCRIPTION OF EMBODIMENTS."

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one aspect of this technology, in the process of restricting the operation of the apparatus, the operation of the apparatus may be restricted more greatly as the remaining period of time of the expendable component is shorter and shorter than the necessary period of time required for the replacement. With such a configuration, the operation of the apparatus can be restricted such that the necessary period of time required for the replacement becomes equal to the remaining period of time without excess or deficiency, for example.

In one aspect of this technology, the at least one computer may execute the following processes: a process of, at a time point before the index indicative of the consumption level reaches the predetermined threshold, specifying a necessary period of time required for replacement of the expendable component at the time point; and a process of correcting the threshold when the remaining period of time of the expendable component, the remaining period of time being associated with the threshold, is shorter than the necessary period of time required for the replacement. With such a configuration, the threshold can be changed in accordance with the necessary period of time required for the replacement.

In one aspect of this technology, in the process of correcting the threshold, the threshold may be corrected more greatly as the remaining period of time of the expendable component is shorter and shorter than the necessary period of time required for the replacement. With such a configuration, the threshold can be corrected such that the necessary period of time required for the replacement becomes equal to the remaining period of time without excess or deficiency, for example.

In one aspect of this technology, the at least one computer may be configured to be communicable with an external device configured to manage the necessary period of time required for the replacement of the expendable component. With such a configuration, the at least one computer can acquire the latest necessary period of time required for the replacement of the expendable component from the external device, for example.

In one aspect of this technology, the index indicative of the consumption level may be strength of an order component corresponding to the expendable component, the order component being extracted from vibration data measured by the apparatus. However, in another aspect, the index indicative of the consumption level does not need to be an index derived from the vibration data, and the index can be set variously depending on the apparatus. For example, in a case where the apparatus is an ink-jet printer, and the expendable component is an ink cartridge, the index indicative of the consumption level may be a residual amount of the ink cartridge.

In one aspect of this technology, the expendable component may be a gear or a bearing. In that case, the order component corresponding to the expendable component may be correlated with a corresponding one of the number of teeth of the gear or the number of rolling elements of the bearing. With such a configuration, the expendable component can be specified by use of the order component correlated with the number of rolling elements.

In one aspect of this technology, the apparatus may include a plurality of expendable components including a first expendable component and a second expendable component. In that case, the process of acquiring the index indicative of the consumption level, the process of specifying the necessary period of time required for the replacement of the expendable component, and the process of restricting the operation of the apparatus may be executed on each of the first expendable component and the second expendable component. Further, an index indicative of a consumption level of the first expendable component may be strength of a first order component extracted from the vibration data measured by the apparatus, and an index indicative of a consumption level of the second expendable component may be strength of a second order component extracted from the vibration data measured by the apparatus. With such a configuration, in a case where the apparatus includes a plurality of expendable components, it is possible to specify an expendable component with a high consumption level from among the expendable components by use of the order components extracted from the vibration data measured by the apparatus.

In one aspect of this technology, the apparatus may be a hydraulic power generating system. Note that, in another aspect, the apparatus may be a printer, for example.

First Embodiment

Figure 1:
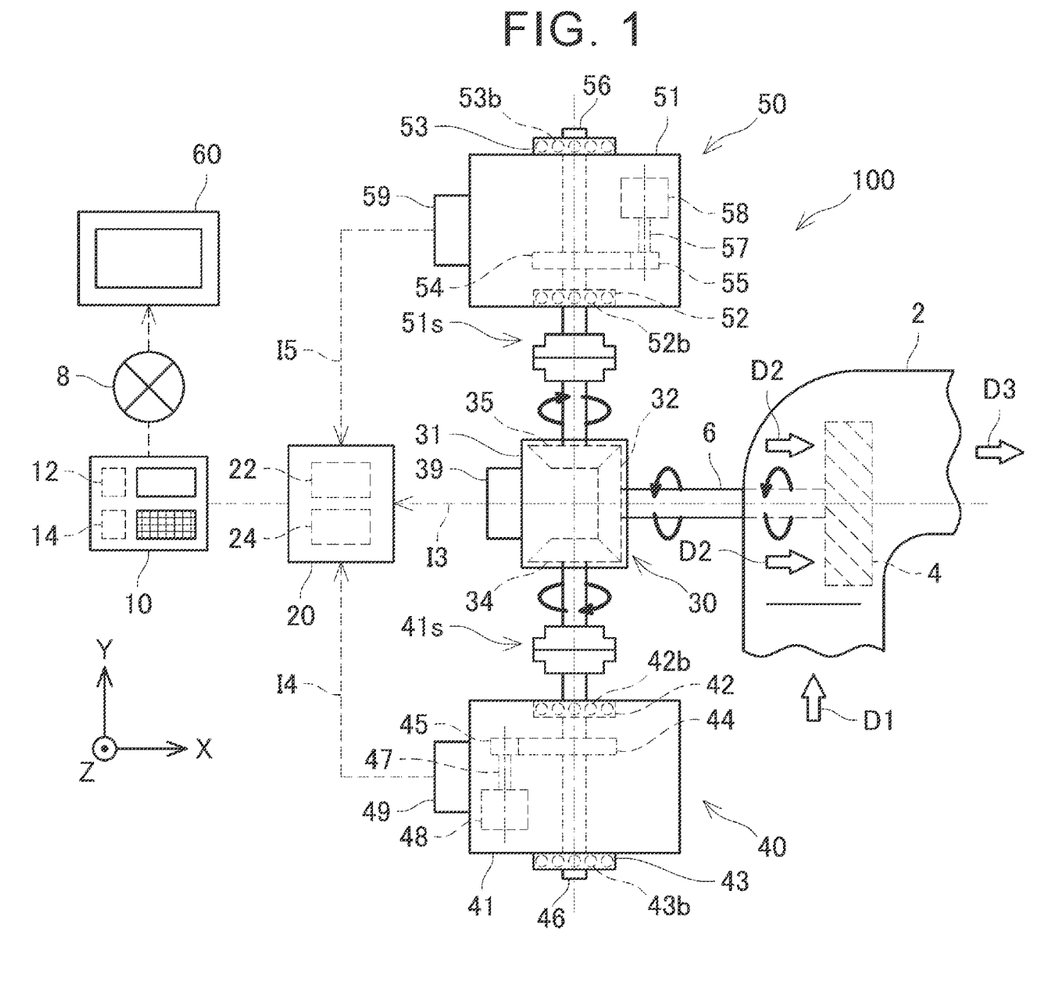
FIG. 1 illustrates a block diagram of a support device 10 according to a first embodiment and a hydraulic power generating system 100 the maintenance of which is supported by the support device 10.

With reference to the drawings, a support device according to a first embodiment will be described. FIG. 1 illustrates a plan view of a support device 10 and a hydraulic power generating system 100 to be supported by the support device 10. The support device 10 is a notebook computer, for example, and includes a CPU 12 and a memory 14. Note that, in a modification, the support device 10 may be a desktop-type personal computer or may be a smartphone, a tablet, or the like. The support device 10 is a device for supporting maintenance on the hydraulic power generating system 100.

The hydraulic power generating system 100 includes a hydraulic turbine 4, a first generator 40, a second generator 50, a speed-increasing gear 30, and a control device 20. The hydraulic power generating system 100 is an apparatus configured to generate electric power by transmitting the rotation of the hydraulic turbine 4 to the generators 40, 50 via the speed-increasing gear 30.

The hydraulic turbine 4 includes a drive shaft 6 extending from the hydraulic turbine 4 to one direction. The drive shaft 6 is a shaft fixed to the center of the hydraulic turbine 4. The hydraulic turbine 4 is placed in a passage 2. The passage 2 curves from a Y-axis direction (that is, the left side on the plane of paper in FIG. 1) toward an X-axis direction (that is, the upper side on the plane of paper in FIG. 1). As indicated by an arrow D1, water in the passage 2 flows through the passage 2 along the Y-axis direction. After that, as indicated by an arrow D2, the water in the passage 2 flows toward the hydraulic turbine 4. The water in the passage 2 flows in the direction of an arrow D3 by passing through the hydraulic turbine 4 along a guide vane provided in the hydraulic turbine 4. As a result, the hydraulic turbine 4 rotates. Hereby, the drive shaft 6 of the hydraulic turbine 4 also rotates similarly. The drive shaft 6 is connected to a driving rotating body 32 of the speed-increasing gear 30.

The speed-increasing gear 30 includes a case 31, the driving rotating body 32, a first driven rotating body 34, a second driven rotating body 35, and a vibration sensor 39. The rotating bodies 32, 34, 35 are accommodated in the case 31. The rotating bodies 32, 34, 35 are bevel gears (that is, gears). The inclined surface of the driving rotating body 32 abuts with the inclined surface of the first driven rotating body 34. Hereby, teeth on the inclined surface of the driving rotating body 32 mesh with teeth on the inclined surface of the first driven rotating body 34. As a result, the first driven rotating body 34 is perpendicular to the drive shaft 6 to which the driving rotating body 32 is fixed. Similarly, the second driven rotating body 35 also meshes with the driving rotating body 32 such that the second driven rotating body 35 is perpendicular to the drive shaft 6. The rotation of the drive shaft 6 is transmitted, via the driving rotating body 32, to the first driven rotating body 34 and the second driven rotating body 35 that are perpendicular to the drive shaft 6.

Further, the number of the teeth of the driving rotating body 32 is larger than the number of the teeth of each of the first driven rotating body 34 and the second driven rotating body 35. The first driven rotating body 34 and the second driven rotating body 35 have the same number of the teeth. As a result, the rotation number of the first driven rotating body 34 and the rotation number of the second driven rotating body 35 are larger than the rotation number of the driving rotating body 32. Hereby, the speed-increasing gear 30 accelerates the rotation of the first driven rotating body 34 and the rotation of the second driven rotating body 35.

The vibration sensor 39 detects the frequency and the rotation number of the speed-increasing gear 30. The vibration sensor 39 transmits the frequency and the rotation number of the speed-increasing gear 30 to the control device 20 as amplifier vibration data 13.

The first generator 40 includes a case 41, a first input shaft 46, a first motor 48, bearings 42, 43, a first input gear 44, a motor gear 45, and a motor shaft 47. Components of the first generator 40 are accommodated in the case 41. The first input shaft 46 is a shaft penetrating through the case 41. The first input shaft 46 is connected to the first driven rotating body 34 of the speed-increasing gear 30 via a shaft coupling 41s. Hereby, the rotation of the drive shaft 6 of the hydraulic turbine 4 is transmitted to the first input shaft 46 of the first generator 40 via the driving rotating body 32 and the first driven rotating body 34 of the speed-increasing gear 30.

The bearings 42, 43 and the first input gear 44 are fixed to the first input shaft 46. The bearings 42, 43 rotatably support the first input shaft 46 against the case 41. The bearings 42, 43 are so-called ball bearings and include a plurality of balls 42b, 43b.

The first input gear 44 is a so-called spur gear. The first input gear 44 meshes with the motor gear 45 that is a spur gear. The motor gear 45 is fixed to the motor shaft 47.

Hereby, the rotation of the first input shaft 46 is transmitted to the motor shaft 47. As a result, magnets (not illustrated) fixed to the motor shaft 47 rotate, so that the first motor 48 generates electric power. Thus, the first generator 40 generates electric power by use of the rotation of the hydraulic turbine 4.

The vibration sensor 49 detects the frequency and the rotation number of the first generator 40. The vibration sensor 49 transmits the frequency and the rotation number of the first generator 40 to the control device 20 as first vibration data 14.

The second generator 50 includes a case 51, a second input shaft 56, a second motor 58, bearings 52, 53, a second input gear 54, a motor gear 55, and a motor shaft 57. Components of the second generator 50 are accommodated in the case 51. The second input shaft 56 is a shaft penetrating through the case 51. The second input shaft 56 is connected to the second driven rotating body 35 via a shaft coupling 51s. Hereby, the rotation of the drive shaft 6 of the hydraulic turbine 4 is transmitted to the second input shaft 56 of the second generator 50 via the driving rotating body 32 and the second driven rotating body 35 of the speed-increasing gear 30. Thus, the second generator 50 has a configuration similar to that of the first generator 40. The vibration sensor 59 transmits the frequency and the rotation number of the second generator 50 to the control device 20 as second vibration data 15.

The control device 20 is a computer including a CPU 22 and a memory 24. The control device 20 controls the operation of the generator 40, 50 in accordance with a program in the memory 24. For example, the control device 20 can execute, on the generator 40, 50, various modes such as a power mode for causing the generator 40, 50 to generate a larger amount of electric power and a save mode for causing the generator 40, 50 to generate a less amount of electric power, in addition to a normal mode for causing the generator 40, 50 to generate a predetermined amount of electric power that is determined in advance. The control device 20 controls the generators 40, 50 based on the pieces of vibration data 13, 14, 15 received from the speed-increasing gear 30 and the generators 40, 50.

A management device 60 is a computer placed in a vendor of the hydraulic power generating system 100. The management device 60 receives the stock status of each expendable component (e.g., a gear wheel, a gear, a bearing) in each of the generators 40, 50 and the speed-increasing gear 30 from a manufacturer (not illustrated) of the expendable component at every predetermined time. Hereby, the management device 60 manages the latest stock status of the expendable component. Further, the management device 60 manages latest information on a logistics state or the like from a factory to the hydraulic power generating system 100, in addition to the stock status of the expendable component. That is, the management device 60 manages a necessary period of time required for replacement of the expendable component. The management device 60 is connected to the support device 10 via an internet 8. Further, the management device 60 can place an order for the expendable component via the internet 8.

Figure 2:
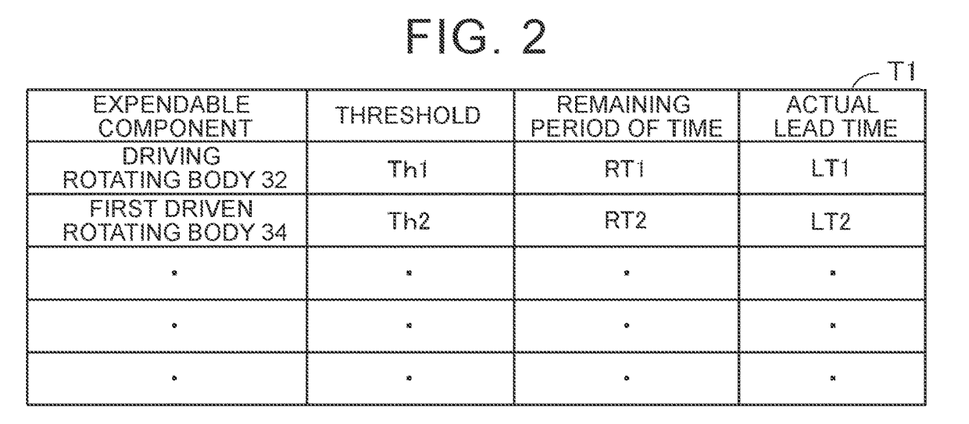
FIG. 2 illustrates an example of a lead time table T1 stored in a memory 14 of the support device 10.

The support device 10 is configured such that a lead time table T1 is stored in the memory 14. As illustrated in FIG. 2, in the lead time table T1, a threshold Th, a remaining period of time RT, and an actual lead time LT are stored for each expendable component in association with each other. For example, a threshold Th1, a remaining period of time RT1, and an actual lead time LT1 are stored in association with each other in terms of the driving rotating body 32.

Similarly, a threshold Th2, a remaining period of time RT2, and an actual lead time LT2 are stored in association with each other in terms of the first driven rotating body 34. Although not illustrated herein, in the lead time table T1, information on the threshold Th or the like corresponding to the other expendable components (that is, the bearings 42, 43, 52, 53, the input gears 44, 54, and so on) are stored.

The threshold Th is a threshold for a consumption level of the expendable component. The consumption level is a value indicative of a consumption degree of the expendable component, and as the value is higher, the consumption degree is higher. The support device 10 identifies the consumption level of the expendable component by use of the threshold. In a case where the consumption level of a given expendable component does not reach the threshold Th, the support device 10 determines that the consumption level of the expendable component is low, and therefore, it is not necessary to replace the given expendable component. In the meantime, in a case where the consumption level of a given expendable component reaches the threshold Th, the support device 10 determines that the consumption level of the expendable component is high, and therefore, it is necessary to replace the given expendable component. Although details are described later, the support device 10 of the present embodiment uses vibration strength of an order component as an index indicative of the consumption level. Here, the order component indicates the number of cycles of vibration (that is, frequency) to be caused while the expendable component rotates once.

Further, an order component corresponding to a gear (that is, each of the rotating bodies 32, 34, 35, each of the gears 44, 45, 54, 55) is correlated with the number of teeth of the gear. An order component corresponding to the bearing 42, 43, 52, 53 corresponds to the number of the balls 42b, 43b, 53b, 54b thereof. An order component corresponding to the bearing 42, 43, 52, 53 is correlated with the number of rolling elements thereof. Thus, by use of an order component correlated with the structure of an expendable component, the support device 10 can associate an order component included in the vibration data I3, I4, I5 with an expendable component.

The remaining period of time RT indicates an expected period of time during which the expendable component works appropriately at a time point when the consumption level of the expendable component reaches the threshold Th. The remaining period of time RT changes depending on the threshold Th. For example, in a case where the threshold Th is set to be low, the remaining period of time RT is long. In a case where the threshold Th is set to be high, the remaining period of time RT is short.

The actual lead time LT is determined based on the stock status of the expendable component at a given time point, a distance from the factory of the expendable component to the hydraulic power generating system 100, a traffic condition, a period of time required for a replacement operation, the number of operators for the replacement operation, and so on. That is, the actual lead time LT indicates a period of time actually required to replace the expendable component. The actual lead time LT is information that can change at each time point. For example, in a case where stocks of the expendable component are insufficient, the actual lead time LT becomes long. The support device 10 receives the latest stock status from the management device 60 via the internet 8 and updates the actual lead time LT in the lead time table T1 by use of the latest stock status. Hereby, the support device 10 can support maintenance for the hydraulic power generating system 100 by use of the latest actual lead time LT. Note that, in a modification, the support device 10 may be configured such that the actual lead time LT is stored in the memory 14 in advance.

Figure 3:
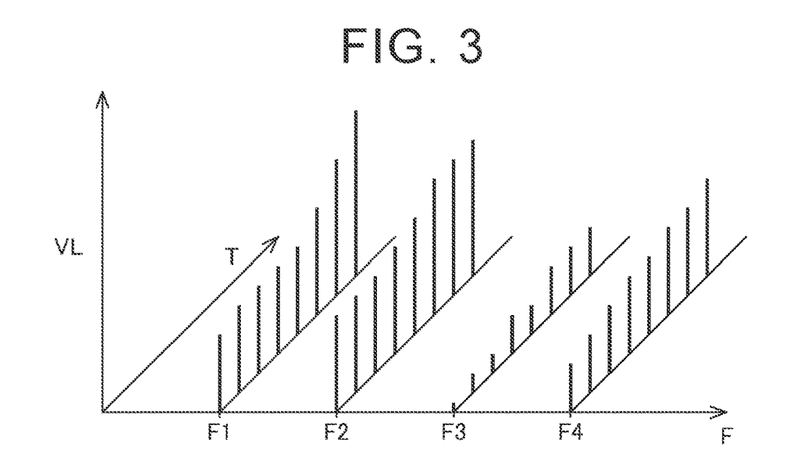
FIG. 3 illustrates the relationship between an operation period of time T and a vibration strength VL in each of order components F1 to F4.
Figure 4:
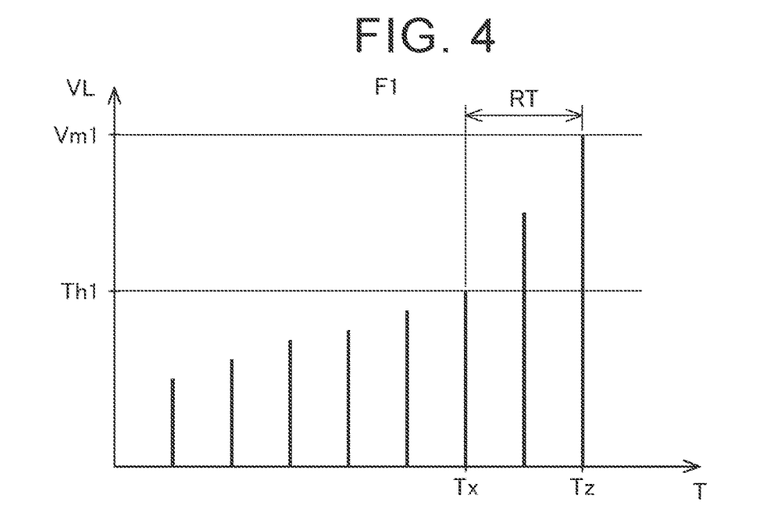
FIG. 4 illustrates the relationship between the operation period of time T and the vibration strength VL in the first order component F1.

With reference to FIGS. 3, 4, the following describes the relationship between an order component F, a vibration strength VL, and an operation period of time T. FIGS. 3, 4 are graphs obtained by performing various tests such as a durability test on each expendable component (e.g., the driving rotating body 32) of the hydraulic power generating system 100. A first order component F1 is the order component of the driving rotating body 32 (see FIG. 1). The vibration strength VL is an index indicative of the strength of vibration such as amplitude. The operation period of time T is a period during which the expendable component works. As illustrated in FIG. 3, the vibration strength VL of the driving rotating body 32 having the first order component F1 increases as the operation period of time T is longer. Similarly, respective vibration strengths VL of other expendable components having order components F2 to F4 increase as their operation periods of time T are longer, though the respective vibration strengths VL are different in magnitude. That is, the vibration strength VL indicates a consumption level of an expendable component.

As illustrated in FIG. 4, the vibration strength VL of the driving rotating body 32 gradually increases along the operation period of time T. The vibration strength VL of the driving rotating body 32 reaches a threshold Th1 at an arrival timing Tx. After that, when the driving rotating body 32 continues its operation, the vibration strength VL exceeds a limit strength Vm1 at a limit timing Tz. The limit strength Vm1 is a strength at which an abnormality is found in the operation of the driving rotating body 32 in the durability test or the like. As illustrated in FIG. 4, when the remaining period of time RT passes after the vibration strength VL of the driving rotating body 32 reaches the threshold Th1 at the arrival timing Tx, the vibration strength VL reaches the limit strength Vm1 at the limiting timing Tz. Thus, the order component F, the threshold Th, and the remaining period of time RT of each expendable component in the hydraulic power generating system 100 are correlated with each other, and their values can be obtained by the durability test or the like.

Figure 5:
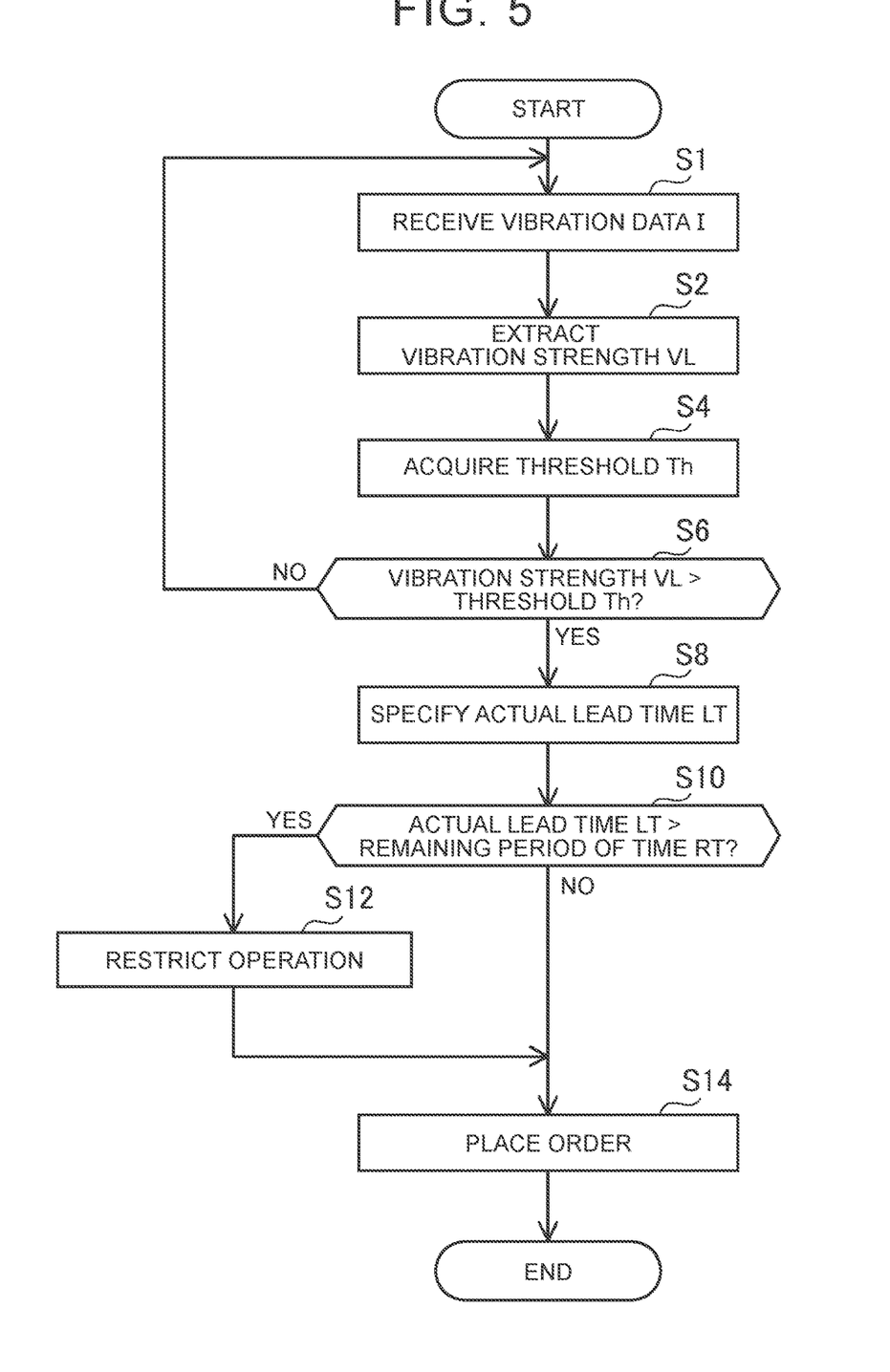
FIG. 5 illustrates a flow diagram of a process to be executed by a CPU 12 of the support device 10 according to the first embodiment.

With reference to FIG. 5, a process to be executed by the CPU 12 of the support device 10 according to the present embodiment will be described. Note that, in the following description, a main body to execute the process is just referred to as the support device 10. When the power supply of the support device 10 is turned on during power generation in the hydraulic power generating system 100, the process in FIG. 5 is started. Before the process in FIG. 5 is started, the generators 40, 50 of the hydraulic power generating system 100 execute power generation in a normal mode.

The support device 10 receives the pieces of vibration data I3 to I5 from the control device 20 (step S1). Subsequently, the support device 10 analyzes the received pieces of vibration data I3 to I5 and extracts a vibration strength VL of each order component F (step S2). That is, the support device 10 acquires a current vibration strength VL of each of the expendable components (hereinafter referred to as a target expendable component) corresponding to the extracted order components F. Further, the support device 10 acquires a threshold Th (e.g., the threshold Th1) corresponding to the target expendable component (e.g., the driving rotating body 32) from the lead time table T1 (see FIG. 2) in the memory 14 (step S4).

The support device 10 compares the vibration strength VL of the target expendable component that is acquired in the process of step S2 with the threshold Th acquired in the process of step S4 (step S6). As has been described with reference to FIG. 4, in a case where the vibration strength VL of the target expendable component does not reach the threshold Th, the consumption level of the target expendable component is low. Accordingly, in a case where the vibration strength VL of the target expendable component does not reach the threshold Th (step S6: NO), the support device 10 executes the process of step S1 again and receives new vibration data I from the control device 20. That is, the support device 10 repeats the processes of step S1 to step S6 until the vibration strength VL of the target expendable component reaches the threshold Th.

In a case where the vibration strength VL of the target expendable component reaches the threshold Th (step S6: YES), the support device 10 specifies an actual lead time LT (e.g., the actual lead time LT1) corresponding to the target expendable component from the lead time table T1 (see FIG. 2) in the memory 14 (step S8). Subsequently, the support device 10 compares the actual lead time LT specified in the process of step S8 with a remaining period of time RT (e.g., the remaining period of time RT1) associated with the threshold Th acquired in the process of step S4 (step S10).

In a case where the remaining period of time RT is longer than the actual lead time LT (step S10: NO), the support device 10 transmits an ordering request signal to request to place an order for the target expendable component to the management device 60 via the internet 8 (step S14). The management device 60 places the order to the manufacturer of the target expendable component. Hereby, before the remaining period of time RT passes, the target expendable component the vibration strength VL of which has reached the threshold Th (that is, the operation period of time T is close to the limit timing Tz) can be replaced with a new expendable component. After that, the support device 10 ends the process in FIG. 5.

In the meantime, in a case where the remaining period of time RT is shorter than the actual lead time LT (step S10: YES), the support device 10 restricts the operation of the apparatus (e.g., the speed-increasing gear 30) including the target expendable component (step S12). For example, the support device 10 shifts the generators 40, 50 to the save mode in step S12. As a result, respective rotation numbers of the rotating bodies 32, 34, 35 in the speed-increasing gear 30 decrease, for example. As a result, the remaining period of time RT of the target expendable component (e.g., the driving rotating body 32) after the restriction on the operation extends.

Further, as the remaining period of time RT is shorter and shorter than the actual lead time LT, the support device 10 decreases respective output powers of the generators 40, 50 in step S12. Hereby, as the remaining period of time RT is shorter and shorter than the actual lead time LT, it is possible to extend the remaining period of time RT of the target expendable component after the restriction on the operation. As a result, the support device 10 can set the remaining period of time RT of the target expendable component after the restriction on the operation such that the remaining period of time RT is sufficient to the actual lead time LT. As such, the support device 10 according to the present embodiment restricts the operation of the target expendable component in accordance with a comparison result between the latest actual lead time LT and the remaining period of time RT. Hereby, even in a case where the actual lead time LT changes, the hydraulic power generating system 100 can be operated such that the remaining period of time RT extends in accordance with the change. As a result, the support device 10 can continue an appropriate operation of the hydraulic power generating system 100.

After that, the support device 10 transmits an ordering request signal corresponding to the target expendable component to the management device 60 via the internet 8 (step S14) and ends the process in FIG. 5. Hereby, it is possible to extend the remaining period of time RT of the target expendable component by restricting the operation and to place an order for a new expendable component to be replaced with the target expendable component.

Second Embodiment

Figure 6:
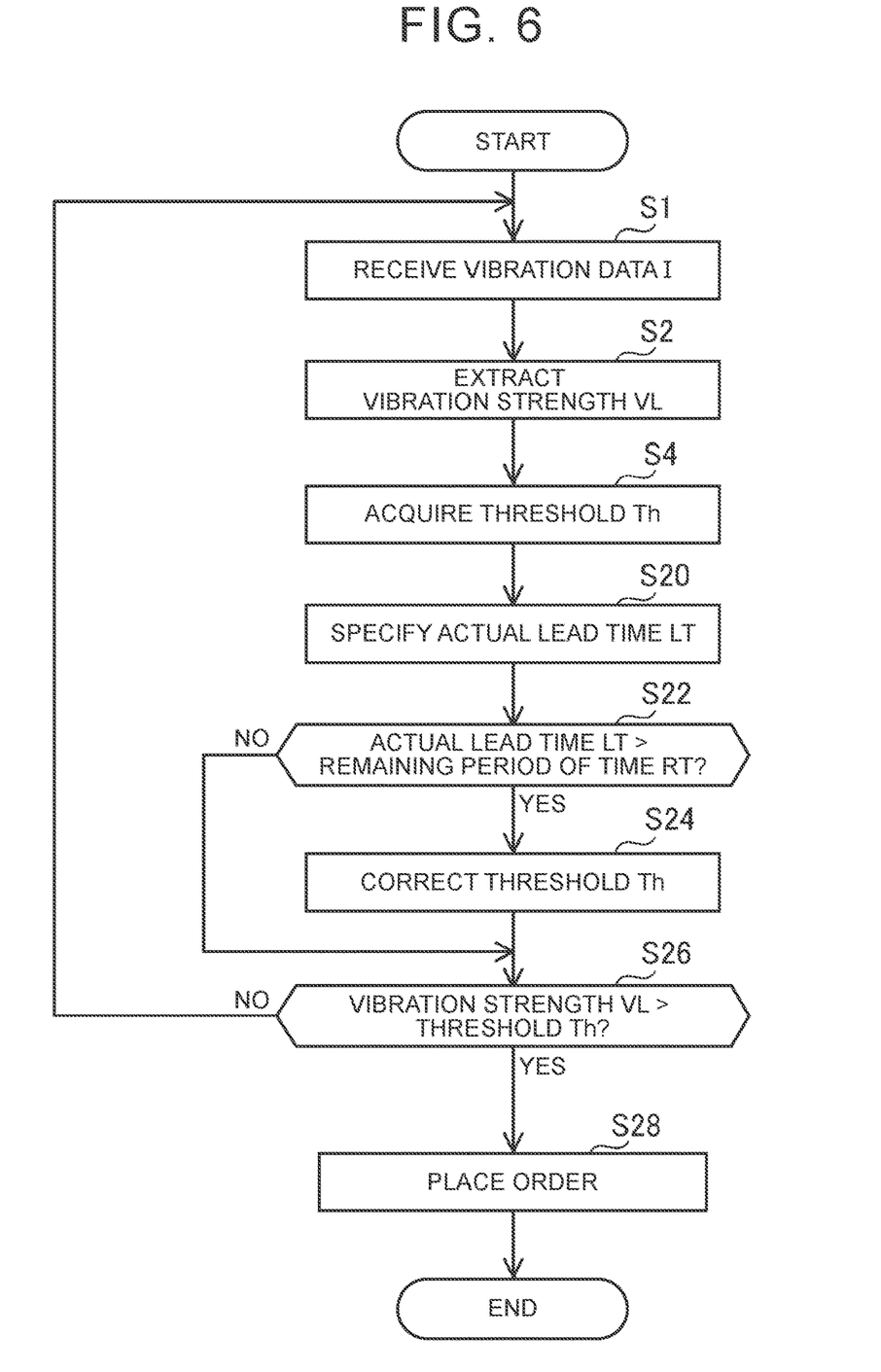
FIG. 6 illustrates a flow diagram of a process to be executed by the CPU 12 of the support device 10 according to the second embodiment.

Subsequently, with reference to FIG. 6, a process to be executed by the support device 10 according to the second embodiment will be described. The support device 10 according to the second embodiment has a configuration similar to that of the support device 10 according to the first embodiment.

When the power supply of the support device according to the second embodiment is turned on during power generation in the hydraulic power generating system 100, the support device executes the processes of steps S1, S2 and S4. After that, the support device specifies the actual lead time LT corresponding to the target expendable component from the lead time table T1 (see FIG. 2) in the memory 14 (step S20) before the support device compares the vibration strength VL with the threshold Th.

Subsequently, the support device 10 compares the actual lead time LT specified in the process of step S20 with the remaining period of time RT associated with the threshold Th acquired in the process of step S4 (step S22). In a case where the remaining period of time RT is shorter than the actual lead time LT (step S22: YES), the support device 10 corrects the threshold Th corresponding to the target expendable component (step S24). More specifically, the support device 10 changes the threshold Th corresponding to the target expendable component to a lower value. Even before the vibration strength VL of the target expendable component reaches the threshold Th, in a case where the remaining period of time RT is shorter than the actual lead time LT, even when an order is placed for the target expendable component after the vibration strength VL of the target expendable component reaches the threshold Th associated with the remaining period of time RT, the target expendable component cannot be replaced before the remaining period of time RT passes. In this case, the hydraulic power generating system 100 cannot continue its operation appropriately.

Accordingly, in a case where the remaining period of time RT is shorter than the actual lead time LT, the support device 10 according to the present embodiment corrects the threshold Th to a lower value. Hereby, it is possible to place an order for the target expendable component at an early stage as compared with the configuration in which an order is placed for the target expendable component after the vibration strength VL reaches the threshold Th before the correction. As a result, the hydraulic power generating system 100 can continue its operation appropriately.

Further, as the remaining period of time RT is shorter and shorter than the actual lead time LT, the support device 10 corrects the threshold Th to be a lower value in step S12. Hereby, as the remaining period of time RT is shorter and shorter than the actual lead time LT, the remaining period of time RT of the target expendable component after the correction becomes shorter. As a result, the support device 10 can set the remaining period of time RT of the target expendable component that corresponds to the corrected threshold Th such that the remaining period of time RT is sufficient to the actual lead time LT.

In the meantime, in a case where the remaining period of time RT is longer than the actual lead time LT (step S22: NO), the support device 10 skips the process of step S24 and executes the process of step S26.

In the process of step 26, the support device 10 compares the vibration strength VL with the threshold Th. Here, as the threshold Th to be compared in the process of step S26, either of the threshold Th acquired in the process of step S4 and the threshold Th corrected in the process of step S24 is used. In a case where the vibration strength VL of the target expendable component reaches the threshold Th (step S26: YES), the support device 10 transmits an ordering request signal corresponding to the target expendable component to the management device 60 via the internet 8 (step S28). After that, the support device 10 ends the process in FIG. 6.

In a case where the vibration strength VL of the target expendable component does not reach the threshold Th (step S26: NO), the support device 10 executes the process of step S1 again and receives new vibration data I. That is, the support device 10 repeats the processes of step S1 to S26 until the vibration strength VL of the target expendable component reaches the threshold Th.

Third Embodiment

Figure 7:
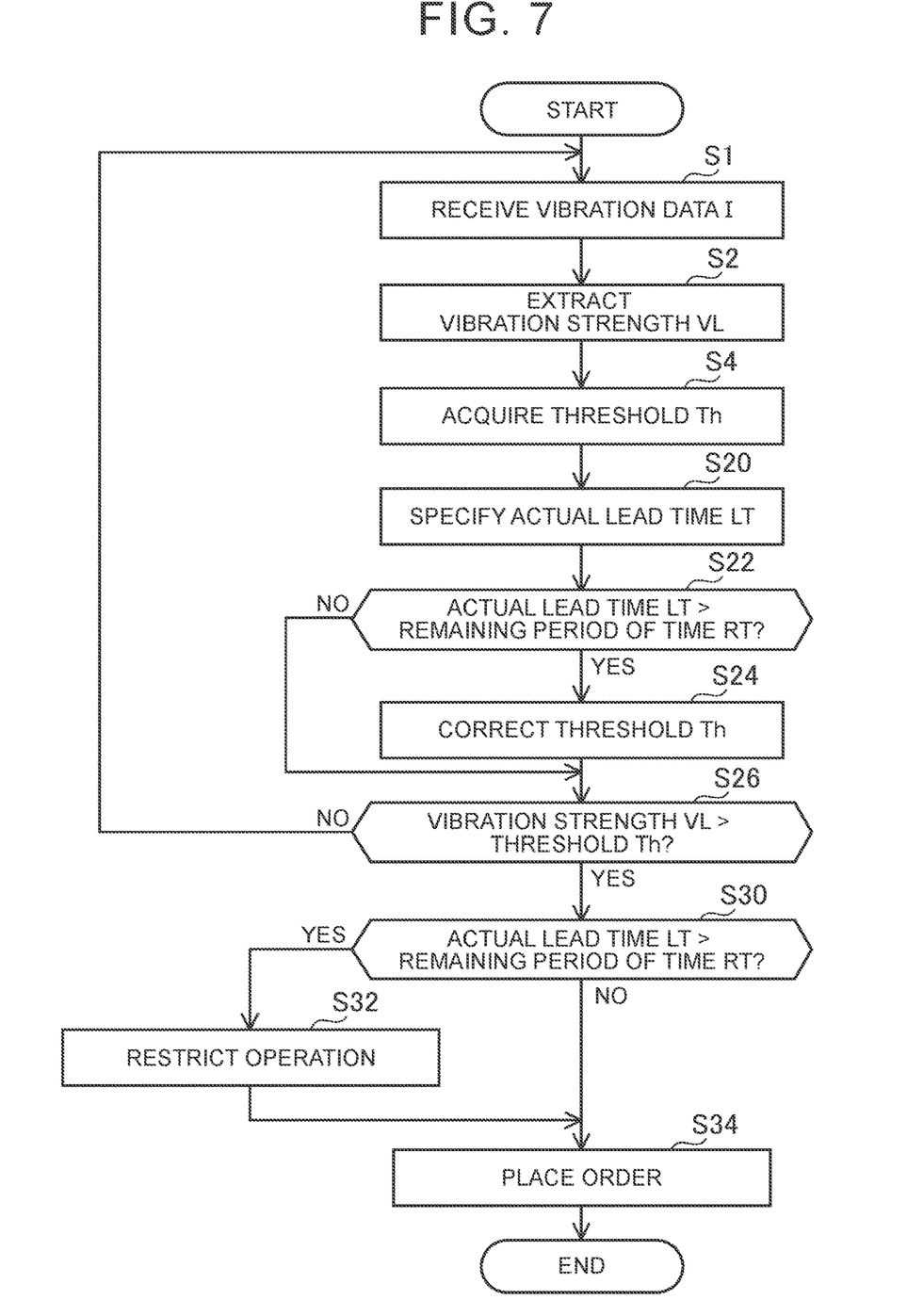
FIG. 7 illustrates a flow diagram of a process to be executed by the CPU 12 of the support device 10 according to the third embodiment.

With reference to FIG. 7, a process to be executed by the support device 10 according to a third embodiment will be described. The support device 10 according to the third embodiment has a configuration similar to those of the support devices 10 according to the first and second embodiments. After the support device according to the third embodiment executes the process of step S1 to step S26 similarly to the support device 10 according to the second embodiment, the support device further compares the actual lead time LT specified in the process of step S20 with the remaining period of time RT associated with the threshold Th (step S30). Here, as the threshold Th to be used to calculate the remaining period of time RT in the process of step S30, either of the threshold Th acquired in the process of step S4 and the threshold Th corrected in the process of step S24 is used.

In a case where the remaining period of time RT is longer than the actual lead time LT (step S30: NO), the support device 10 transmits an ordering request signal corresponding to the target expendable component to the management device 60 via the internet 8 (step S34) and ends the process in FIG. 7.

In the meantime, in a case where the remaining period of time RT is shorter than the actual lead time LT (step S30: YES), the support device 10 sets the generators 40, 50 in the save mode (step S32). Hereby, it is possible to extend the remaining period of time RT of the target expendable component after the restriction on the operation. After that, the support device 10 transmits an ordering request signal corresponding to the target expendable component to the management device 60 via the internet 8 (step S34) and ends the process in FIG. 7.

The specific example of the technology disclosed in the present specification has been explained in detail. However, the example is for illustration only, and does not limit the scope of the claims. The technology described in the scope of the claims includes the foregoing example with various modifications and changes. The following describes modifications of the above embodiments.

Modification 1

The support device 10 according to the first embodiment may not decrease the output powers from the generators 40, 50 as the remaining period of time RT is shorter and shorter than the actual lead time LT, in the process of step S12. In that case, in a case where the remaining period of time RT is shorter than the actual lead time LT, the support device 10 may set the generators 40, 50 in a predetermined save mode regardless of the difference between the remaining period of time RT and the actual lead time LT. In a further modification, in a case where the remaining period of time RT is shorter than the actual lead time LT, the support device 10 may stop the operations of the generators 40, 50. Hereby, the operations of the generators 40, 50 are stopped before an abnormality occurs in the generators 40, 50, thereby making it possible to restrain failure in the generators 40, 50.

Modification 2

The support device 10 according to the second embodiment may not decrease the threshold Th as the remaining period of time RT is shorter and shorter than the actual lead time LT, in the process of step S24. In that case, in a case where the remaining period of time RT is shorter than the actual lead time LT, the support device 10 may correct the threshold Th to a predetermined threshold Th regardless of the difference between the remaining period of time RT and the actual lead time LT.

Modification 3

The support device 10 may be placed in a vendor of the hydraulic power generating system 100, similarly to the management device 60.

Each of and various combinations of the technical elements described in the present specification or the drawings achieve technical utility, and the technical elements are not limited to the combination stated in the claims at the time of filing. Further, the technologies described in the present specification or the drawings can achieve a plurality of objects at the same time and have technical utility by achieving one of those objects.

What is claimed is:

1. A support device for supporting maintenance on an apparatus including an expendable component, the support device comprising at least one computer configured to:
    acquire an index indicative of a consumption level of the expendable component;
    specify a necessary period required for replacement of the expendable component at a first time point when the index indicative of the consumption level reaches a threshold;
    specify the necessary period at a second time point before the index indicative of the consumption level reaches the threshold; and
    restrict an operation of the apparatus and correct the threshold when a remaining period of the expendable component is shorter than the necessary period required for the replacement, the remaining period being associated with the threshold.

2. The support device according to claim 1, wherein the at least one computer is configured to restrict the operation of the apparatus more greatly as the remaining period of the expendable component becomesis shorter and shorter than the necessary period required for the replacement.

3. The support device according to claim 1, wherein the at least one computer is configured to correct, the threshold more greatly as the remaining period of the expendable component becomes shorter and shorter than the necessary period required for the replacement.

4. The support device according to claim 1, wherein the at least one computer is configured to communicate with an external device configured to manage the necessary period required for the replacement of the expendable component.

5. The support device according to claim 1, wherein the index indicative of the consumption level is strength of an order component corresponding to the expendable component, the order component being extracted from vibration data measured by the apparatus.

6. The support device according to claim 5, wherein:
the expendable component is a gear or a bearing; and
the order component corresponding to the expendable component is correlated with a corresponding one of the number of teeth of the gear or the number of rolling elements of the bearing.

7. The support device according to claim 5, wherein:
the apparatus includes a plurality of the expendable components.

8. The support device according to claim 1, wherein the apparatus is a hydraulic power generating system.

9. A support device for supporting maintenance on an apparatus including an expendable component, the support device comprising at least one computer configured to:
acquire an index indicative of a consumption level of the expendable component;
determine whether or not the index indicative of the consumption level reaches a threshold;
specify a necessary period required for replacement of the expendable component at a time point before the index indicative of the consumption level reaches the threshold; and
correct the threshold when a remaining period of the expendable component is shorter than the necessary period required for the replacement, the remaining period being associated with the threshold.

* * * * *